United States Patent
Huang et al.

(10) Patent No.: US 12,014,044 B1
(45) Date of Patent: Jun. 18, 2024

(54) CONTROL DEVICE, CONTROL METHOD AND VIRTUAL IMAGE DISPLAY SYSTEM

(71) Applicant: HTC Corporation, Taoyuan (TW)

(72) Inventors: Chun-Kai Huang, Taoyuan (TW); Su Kang Chou, Taoyuan (TW); Chih Chien Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/154,853

(22) Filed: Jan. 16, 2023

(51) Int. Cl.
| | |
|---|---|
| *G06F 3/04883* | (2022.01) |
| *G06F 3/03* | (2006.01) |
| *G06F 3/0354* | (2013.01) |
| *G06F 3/038* | (2013.01) |
| *G06F 3/0482* | (2013.01) |
| *G06V 30/32* | (2022.01) |

(52) U.S. Cl.
CPC ........ *G06F 3/04883* (2013.01); *G06F 3/0304* (2013.01); *G06F 3/03545* (2013.01); *G06F 3/0383* (2013.01); *G06F 3/0482* (2013.01); *G06V 30/347* (2022.01)

(58) Field of Classification Search
CPC ............... G06F 3/04883; G06F 3/0304; G06F 3/03545; G06F 3/0383; G06F 3/0482; G06V 30/347
See application file for complete search history.

(56) References Cited

U.S. PATENT DOCUMENTS

| | | | | |
|---|---|---|---|---|
| 2014/0075549 | A1* | 3/2014 | Lewis ................ | G06F 3/04883 726/19 |
| 2015/0169214 | A1* | 6/2015 | Kelso ................ | G06F 3/03545 715/771 |
| 2016/0070410 | A1* | 3/2016 | Lin ................... | G06F 3/04883 345/173 |
| 2017/0262045 | A1* | 9/2017 | Rouvinez .......... | G06F 3/011 |
| 2022/0058879 | A1* | 2/2022 | Rohan ............... | G06V 30/1478 |

FOREIGN PATENT DOCUMENTS

| | | |
|---|---|---|
| CN | 108664152 | 10/2018 |
| CN | 114740997 | 7/2022 |

OTHER PUBLICATIONS

"Office Action of Taiwan Counterpart Application", issued on Jan. 9, 2024, p. 1-p. 8.

* cited by examiner

*Primary Examiner* — Robert J Michaud
(74) *Attorney, Agent, or Firm* — JCIPRNET

(57) ABSTRACT

The present disclosure provides a control device, a control method and a virtual image display system. The control device controls a display. The control device includes an optical sensing component, a touch sensing component and a controller. The optical sensing component is configured to acquire optical sensing data of the control device when the control device moves in an environmental space. The touch sensing component is configured to acquire touch data of the control device when the control device moves on a plane. The controller is configured to generate a handwriting image according to the optical sensing data and the touch data, such that the display displays the handwriting image.

20 Claims, 4 Drawing Sheets

CONTROL DEVICE, CONTROL METHOD AND VIRTUAL IMAGE DISPLAY SYSTEM

BACKGROUND

Technical Field

The present disclosure relates to a control device, and particularly to a control device, a control method and a virtual image display system.

Description of Related Art

Generally speaking, in extended reality (XR) applications such as virtual reality (VR) or augmented reality (AR), a user may hold a controller and wear a head-mounted display for an immersive experience. In the aforementioned applications, the head-mounted display may display a virtual cursor, and the controller may control the movement of the virtual cursor. However, the existing controller cannot accurately control the movement of the virtual cursor as handwriting, so that the controller cannot simulate the handwriting function in an immersive experience.

SUMMARY

The present disclosure provides a control device capable of realizing the handwriting function in an immersive experience.

The control device of an embodiment of the present disclosure is suitable for controlling a display. The control device includes an optical sensing component, a touch sensing component and a controller. The optical sensing component is configured to acquire optical sensing data of the control device when the control device moves in an environmental space. The touch sensing component is configured to acquire touch data of the control device when the control device moves on a plane. The controller is coupled to the optical sensing component, the touch sensing component and the display. The controller is configured to generate a handwriting image according to the optical sensing data and the touch data, such that the display displays the handwriting image.

An embodiment of the present disclosure further provides a control method for controlling display. The control method includes the following steps. When the control device moves in an environmental space, optical sensing data of a control device is acquired through an optical sensing component of the control device. When the control device moves on a plane, touch data of the control device is acquired through a touch sensing component of the control device. A handwriting image is generated according to the optical sensing data and the touch data through a controller of the control device. The handwriting image is displayed through the display.

An embodiment of the present disclosure further provides a virtual image display system. The virtual image display system includes a control device and a display. The control device includes an optical sensing component, a touch sensing component and a controller. The optical sensing component is configured to acquire optical sensing data of the control device when the control device moves in an environmental space. The touch sensing component is configured to acquire touch data of the control device when the control device moves on a plane. The controller is coupled to the optical sensing component and the touch sensing component. The controller is configured to generate a handwriting image according to the optical sensing data and the touch data. The display is coupled to the controller. The display is configured to display the handwriting image.

Based on the above, the control device, the control method, and the virtual image display system of the embodiments of the present disclosure may acquire the moving trace (i.e., the optical sensing data) of a control device itself in the three-dimensional space and acquire the handwriting trace (i.e., touch data) of the control device in the two-dimensional plane. The control device may generate a handwriting image according to the aforementioned multiple traces, so that the display may display the handwriting image, and thus, the handwriting function may be applied to an immersive experience.

In order to make the aforementioned features and advantages of the disclosure more comprehensible, embodiments accompanied with figures are described in detail below.

DESCRIPTION OF THE EMBODIMENTS

Parts of the embodiments of the present disclosure will be described in detail with reference to the accompanying drawings. For the reference symbols in the following description, the same reference symbols in different drawings indicate the same or similar components. These embodiments are only a part of the present disclosure, and do not reveal all possible implementations of the present disclosure. Rather, these embodiments are only examples within the scopes of the claims of the present disclosure.

Figure 1:
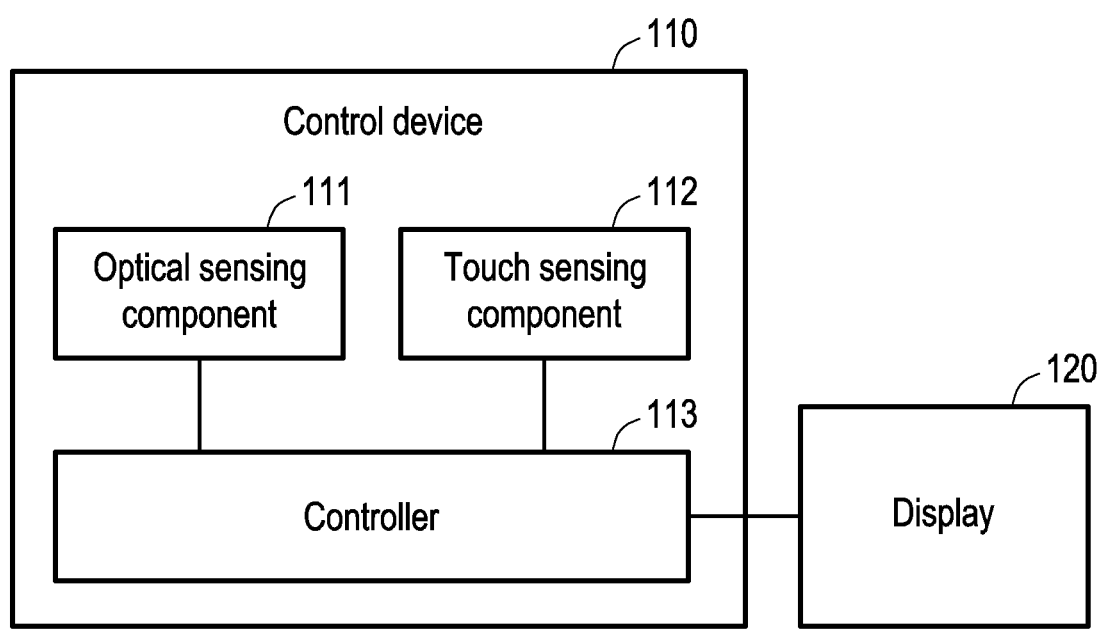
FIG. 1 is a block diagram of a virtual image display system according to an embodiment of the present disclosure.

FIG. 1 is a block diagram of a virtual image display system according to an embodiment of the present disclosure. Referring to FIG. 1, the virtual image display system 100 may be, for example, a display system applying extended reality (XR) such as virtual reality (VR) or augmented reality (AR). In this embodiment, the virtual image display system 100 may include a control device 110 and a display 120. The control device 110 may be coupled to the display 120 and control the display 120. In this embodiment, the control device 110 may be implemented, for example, as a hand-held device such as a handle or a joystick.

In this embodiment, the display 120 may be disposed in a wearable device or an electronic device (not shown). The display 120 may be, for example, a liquid crystal display, (LCD), a light-emitting diode (LED), an organic light-emitting diode (OLED) or a display with a display function. The aforementioned wearable device may include a head-mounted display (HMD). The aforementioned electronic device may be, for example, a desktop computer, a notebook computer, or a tablet computer.

In the embodiment of FIG. 1, the control device 110 may include an optical sensing component 111, a touch sensing component 112 and a controller 113. The controller 113 is coupled to the optical sensing component 111, the touch sensing component 112 and the display 120. In this embodiment, the optical sensing component 111 may sense (or track) the movement of the control device 110 in a three-dimensional space. The optical sensing component 111 may be implemented, for example, as a light radar (LiDAR) or a camera. In this embodiment, the touch sensing component 112 may sense (or track) the movement of the control device 110 on a plane. The touch sensing component 112 may be implemented, for example, as a touch sensor, an optical (surface) navigation sensor, or a proximity sensor.

In this embodiment, the controller 113 may be, for example, a signal converter, a field programmable gate array (FPGA), a central processing unit (CPU), or a microprocessor for general purpose or special purpose, a digital signal processor (DSP), a programmable controller, an application specific integrated circuit (ASIC), a programmable logic device (PLD), a similar device or a combination of these devices, which may load and execute relevant firmware or software to achieve analysis and calculation functions.

Figure 2:
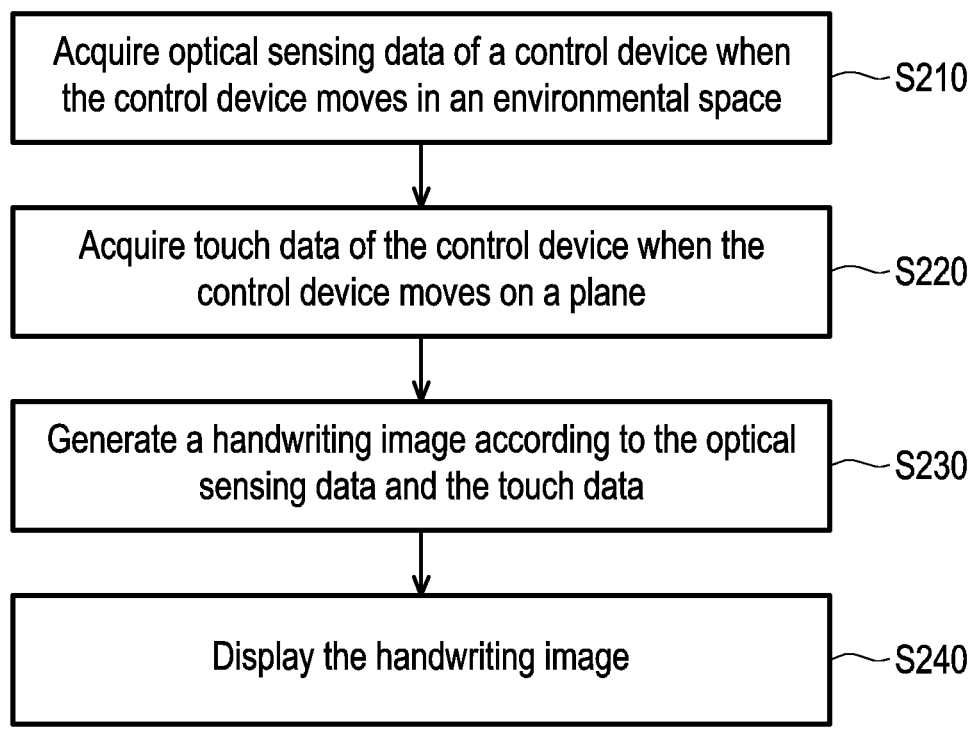
FIG. 2 is a flowchart of a control method according to an embodiment of the disclosure.

FIG. 2 is a flowchart of a control method according to an embodiment of the disclosure. Referring to FIG. 1 and FIG. 2, the control device 110 may execute the control method shown in steps S210-S240 to control the display 120. In this embodiment, steps S210-S240 may be applied to the following exemplary situations.

In this embodiment, the user may wear and use a wearable device with the display 120, or use an electronic device with the display 120. At the same time, the user may hold the control device 110 to control the display 120. In this embodiment, when the virtual image display system 100 performs a handwriting function, the user may regard the control device 110 as a pen to write on any plane, so that the display 120 displays the corresponding handwriting content.

In step S210, the optical sensing component 111 acquires optical sensing data of the control device 110 when the control device 110 moves in an environment space. That is to say, when the control device 110 moves, the optical sensing component 111 tracks the three-dimensional movement of the control device 110 in space, so as to acquire the position and posture of the control device 110 during the handwriting process.

In step S220, the touch sensing component 112 acquires touch data of the control device 110 when the control device 110 moves on a plane. It is noted that the control device 110 is in physical contact with the surface for writing. That is to say, when the control device 110 moves, the touch sensing component 112 tracks the two-dimensional movement of the control device 110 on the plane, so as to acquire the handwriting content of the control device 110 during the handwriting process.

In step S230, the controller 113 generates a handwriting image according to the optical sensing data and the touch data. That is to say, the controller 113 considers the position and posture of the control device 110 during the handwriting process, as well as the handwriting content, and therefore generates the handwriting image accordingly. In this embodiment, the controller 113 may transmit the handwriting image to the display 120.

In step S240, the display 120 displays the handwriting image.

It is worth mentioning here that, the control device 110 may be regarded as a pen to write on any plane, and may track the moving trace (e.g., optical sensing data) of the control device 110 itself in the environment space during the handwriting process, and track the handwriting trace (e.g., touch data) of the control device 110 on the plane. In this way, the controller 113 may fuse the aforementioned moving trace and handwriting trace to generate a handwriting image, so the control device 110 may apply the handwriting function to an immersive experience.

Figure 3:
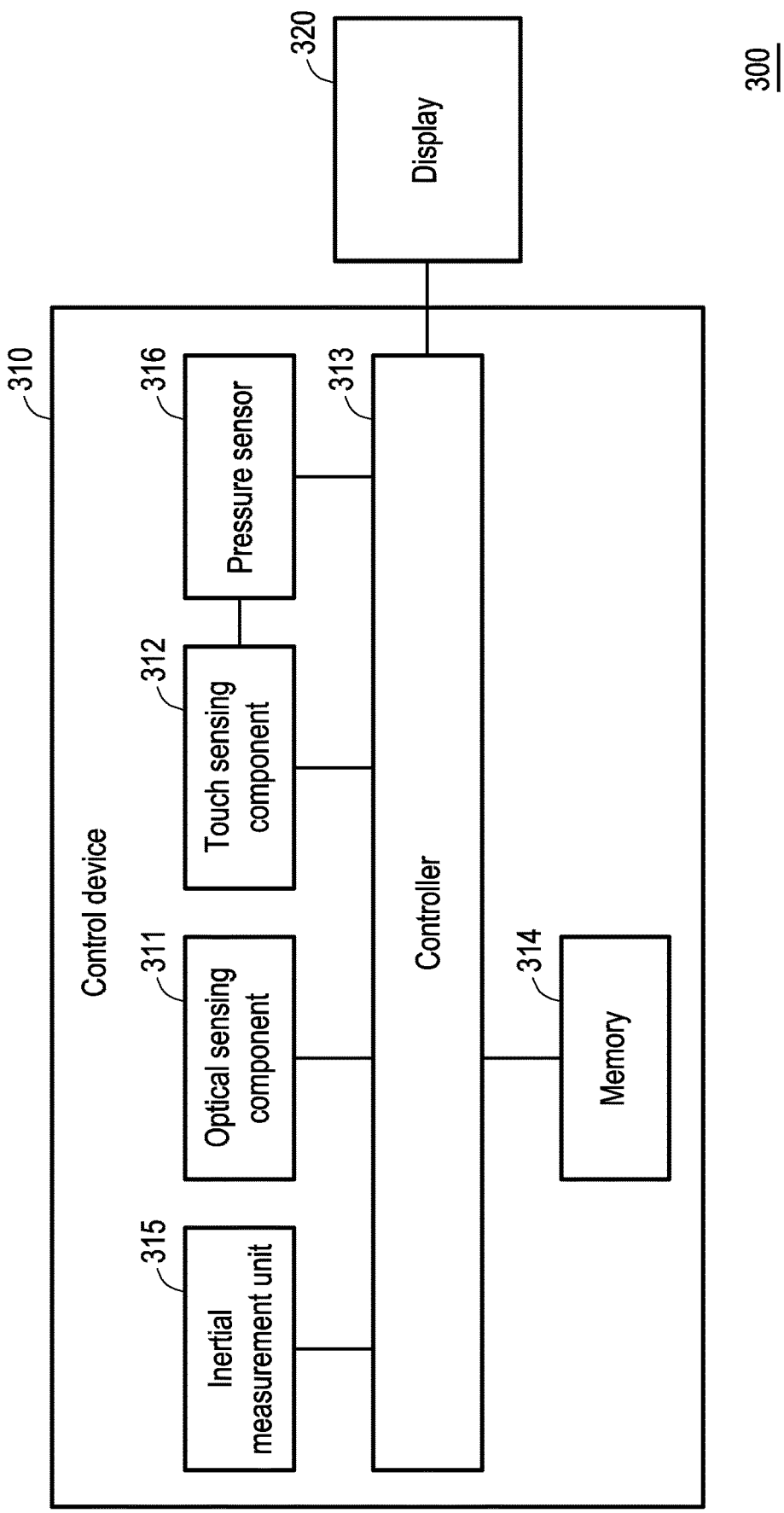
FIG. 3 is a block diagram of a virtual image display system according to another embodiment of the present disclosure.

FIG. 3 is a block diagram of a virtual image display system according to another embodiment of the present disclosure. Referring to FIG. 3, the virtual image display system 300 may include a control device 310 and a display 320. An optical sensing component 311, a touch sensing component 312, a controller 313, and a display 320 included in the control device 310 may be deduced with reference to the relevant description of the virtual image display system 100, so the details are not be repeated here.

In the embodiment of FIG. 3, the control device 310 may further include a memory 314, an inertial measurement unit (IMU) 315 and a pressure sensor 316. The memory 314, the inertial measurement unit 315 and the pressure sensor 316 are respectively coupled to the controller 313.

Figure 4:
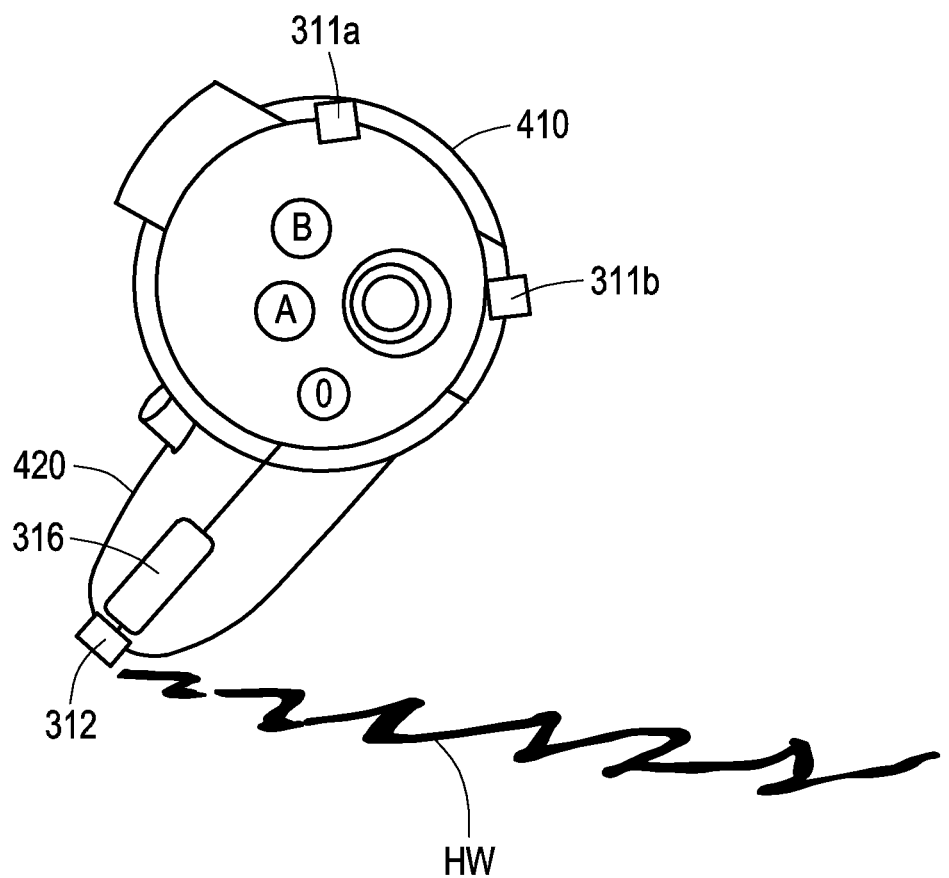
FIG. 4 is a schematic diagram of the control device shown in the embodiment of FIG. 3 according to the present disclosure.

Referring to FIG. 4 at the same time, FIG. 4 is a schematic diagram of the control device 310 shown in the embodiment of FIG. 3 according to the present disclosure. The control device 310 may be implemented, for example, as a handle. The control device 310 may include a body 410 and a grip part 420. The grip part 420 may be, for example, a portion of the body 410 that extends outward for a user to grip. In this embodiment, the optical sensing component 311, the controller 313, the memory 314 and the inertial measurement unit 315 (not shown in FIG. 4) may be disposed in the body 410. The touch sensing component 312 and the pressure sensor 316 may be disposed in the grip part 420.

In this embodiment, the optical sensing component 311 may include at least one camera (e.g., two cameras 311a-311b). These cameras 311a-311b may be respectively arranged in multiple different positions of the body 410. Since the cameras 311a-311b are located in different positions, the cameras 311a-311b may photograph the environmental space from different angles of view to acquire at least one environmental image in the optical sensing data. In this embodiment, the cameras 311a-311b may be, for example, depth cameras, fisheye cameras, and complementary metal oxide semiconductor (CMOS) cameras, or charge coupled device (CCD) cameras, respectively. The number and arrangement of the cameras 311a-311b in the embodiment shown in FIG. 4 are merely examples, and the disclosure is not limited thereto.

It is noted that, in this embodiment, as compared with a single camera, multiple cameras 311a-311b may increase the amount of optical sensing data, and may improve the accuracy of cognition of the environment space and the accuracy of the cognition of the shape and posture for the control device 310. In some embodiments, a single camera may operate in conjunction with another component (e.g., a head mounted display or an inertial measurement unit 315) to track the control device 310.

In this embodiment, the controller 313 may track the control device 310 according to the data measured by the cameras 311a-311b, so as to acquire the moving trace (i.e., position and posture data) of the control device 310 itself in the environment space. Specifically, according to at least one environment image and based on a simultaneous localization and mapping (SLAM) algorithm, the controller 313 may define the posture of the control device 310 itself, and position the control device 310 at the same time. Therefore, based on the SLAM algorithm and according to the aforementioned image, the controller 313 may track the position and the angle of the control device 310 when the control device moves in the environment space relative to the plane, so as to generate position and posture data.

In this embodiment, the inertial measurement unit 315 may sense (or track) the position and the angle (i.e., the inclination angle of the user's grip with respect to the plane) of the control device 310 when the control device 310 moves in the environment space to acquire an inertial signal. That is to say, the inertial signal includes inertial measurements of the control device 310. In one embodiment, the inertial measurements may include changes in six degrees of freedom (DOF). The six degrees of freedom include three translation values corresponding to the three perpendicular axes and three rotation values corresponding to the three perpendicular axes. In other words, the inertial measurements contain three axis accelerations and three axis plane angular velocities.

In this embodiment, the controller 313 may track the control device 310 according to the signal measured by the inertial measurement unit 315 to acquire position and posture data. Specifically, according to the inertial signal and based on the simultaneous localization and mapping algorithm, the controller 313 may define the posture of the control device 310 itself, and position the control device 310 at the same time. Therefore, according to the aforementioned signal and based on the SLAM algorithm, the controller 313 may track the position and the angle of the control device 310 when the control device 310 moves in the environment space relative to the plane, so as to generate the position and posture data.

In this embodiment, based on the simultaneous localization and mapping algorithm, the controller 313 may also track the control device 310 according to the environmental images and inertial signals respectively measured by the cameras 311a-311b and the inertial measurement unit 315 to acquire the position and posture data.

Continuing the above description, the controller 313 may generate a handwriting image according to the above-mentioned moving trace (i.e., position and posture data) and the handwriting trace HW (i.e., touch data) of the control device 310 on the plane, so as to render the handwriting result. It is noted that, the control device 310 is capable of handwriting on any plane and rendering a handwriting image accordingly, without being limited to handwriting on a touchpad or other registered planes.

In this embodiment, the touch sensing component 312 may include an optical surface navigation sensor or a proximity sensor. The optical surface navigation sensor or the proximity sensor may be disposed in the grip part 420. The optical surface navigation sensor or the proximity sensor may sense (or track) the touch signal of the grip part 420 relative to the plane. Specifically, the optical surface navigation sensor or the proximity sensor may determine whether the grip part 420 touches the surface. When the optical surface navigation sensor or the proximity sensor determines that the grip part 420 touches the plane, the aforementioned sensor starts to track the handwriting trace when the control device 310 moves on the plane, so as to acquire the handwriting trace HW (i.e., touch data).

In this embodiment, the pressure sensor 316 is coupled to the touch sensing component 312. The pressure sensor 316 may sense (or track) the force applied to the touch sensing component 312. In this embodiment, when the touch sensing component 312 touches the plane, the pressure sensor 316 acquires the handwriting force of the touch sensing component 312 when the touch sensing component 312 moves on the plane. That is to say, the pressure sensor 316 may sense the force fed back from the plane to the touch sensing component 312, so it may sense the force of writing.

Continuing the above description, the controller 313 may generate a handwriting image according to the optical sensing data (i.e., environmental images) acquired by the cameras 311a-311b, the handwriting trace HW (i.e., touch data) and the above-mentioned handwriting force, so as to render the handwriting result. In an embodiment, the controller 313 may further consider the inertial signal acquired by the inertial measurement unit 315 and generate a handwriting image accordingly.

It is noted that, the touch sensing component 312 may be disposed on the bottom of the grip part 420, so the touch sensing component 312 may be regarded as a pen tip for handwriting on the plane. One end of the pressure sensor 316 may be attached to the touch sensing component 312 to sense the handwriting force, so the controller 313 may simulate a handwriting according to the handwriting force.

In this embodiment, the controller 313 may generate stroke traces according to multiple environmental images and touch data. The stroke traces may be, for example, a series of records of the positions and postures of the control device 310. That is to say, the stroke traces may be, for example, un-rendered tracks, and may be used as original stroke data or a pose log. In one embodiment, the controller 313 may generate stroke traces according to multiple environmental images, touch data, and inertial signals and/or handwriting force.

In this embodiment, display 320 may display multiple stroke conditions. The stroke conditions may include data composed of items such as brush tools, colors, and plane materials. The user may operate (e.g., wave or press a button) the control device 310 to select a stroke condition. In this embodiment, the controller 313 may generate a handwriting image according to the selected stroke condition and the above-mentioned stroke trace, so that the display 320 may display the handwriting image. That is to say, the controller 313 may apply the selected stroke condition to the stroke trace based on the stroke algorithm to change the stroke effect of the stroke trace.

In this embodiment, the memory 314 may access related algorithms used by the controller 313 to execute the handwriting function, and may also access content related to the handwriting function (such as handwriting images, stroke traces, and multiple stroke conditions), and related algorithms, programs and data used by the controller 113 to execute the rendering function, etc., for implementing the control method of the present disclosure. The memory 314 may be, for example, a dynamic random access memory (DRAM), a flash memory or a non-volatile random access memory (NVRAM), etc.

In this embodiment, when the user has executed the handwriting function and the memory 314 has accessed the corresponding stroke trace, the user may operate the control device 310 to change the stroke effect of the stroke trace. Specifically, the controller 313 may access the stroke trace and multiple stroke conditions in the memory 314. The controller 313 may generate a new handwriting image according to the selected stroke condition and the accessed stroke trace, so as to update the handwriting image. Therefore, display 320 may display the updated handwriting image.

To sum up, the control device, the control method and the virtual image display system of the embodiments of the present disclosure use at least one camera to acquire one or more environmental images with different depths generated by the control device when the control device moves (writes), and may also use the inertial measurement unit to acquire inertial signals to track the moving trace of the control device itself in the environment space. The touch sensing component arranged on the grip part may be used as a pen tip, and may track the handwriting trace of the control device on the plane. In this way, the controller may render a handwriting image according to the aforementioned moving trace and the handwriting trace, so that the display may display the handwriting image. Accordingly, the control device may realize the handwriting function in the application of AR or VR. In some embodiments, the controller may change the stroke effect of the stroke trace based on the selected stroke condition, so as to enrich the user's experience.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A control device suitable for controlling a display when the control device being hold by a user to write on a plane, comprising:
   a body;
   a grip part extending from the body;
   an optical sensing component disposed in the body, and configured to acquire optical sensing data of the control device when the control device moves in an environmental space relative to a plane;
   a touch sensing component disposed in the grip part, and configured to acquire touch data that the control device starts tracking the control device moves on the plane when the control device touches the plane; and
   a controller coupled to the optical sensing component, the touch sensing component and the display, and configured to:
   acquire a three-dimensional moving trace according to the optical sensing data;
   acquire a two-dimensional handwriting trace according to the touch data; and
   fuse the three-dimensional moving trace and the two-dimensional handwriting trace to generate a handwriting image, so that the display displays the handwriting image.

2. The control device of claim 1, wherein the optical sensing component comprises:
   at least one camera configured to photograph the environment space to acquire at least one environment image in the optical sensing data.

3. The control device of claim 2, wherein the controller is further configured to generate position and posture data by tracking a position and an angle of the control device when the control device moves in the environment space relative to the plane according to the at least one environment image and based on a simultaneous localization and mapping algorithm, and the controller is further configured to generate the handwriting image according to the position and posture data and the touch data.

4. The control device of claim 1, further comprising:
   an inertial measurement unit coupled to the controller, and configured to acquire an inertial signal.

5. The control device of claim 4, wherein the controller is further configured to track a position and an angle of the control device when the control device moves in the environment space relative to the plane according to the inertial signal and based on a simultaneous localization and mapping algorithm to generate position and posture data, and the controller is further configured to generate the handwriting image according to the position and posture data and the touch data.

6. The control device of claim 1, wherein the touch sensing component comprises:
   an optical surface navigation sensor or a proximity sensor disposed in the grip part of the control device.

7. The control device of claim 6, wherein the optical surface navigation sensor or the proximity sensor is configured to determine whether the grip part touches the plane, and when the grip part touches the plane, the optical surface navigation sensor or the proximity sensor starts to track the two-dimensional handwriting trace as the control device moves on the plane, so as to acquire the touch data.

8. The control device of claim 1, wherein the controller is further configured to generate a stroke trace according to the optical sensing data and the touch data, and generate the handwriting image according to a selected one of a plurality of stroke conditions and the stroke trace.

9. The control device of claim 8, further comprising:
   a memory, coupled to the controller, and configured to access the stroke trace and the stroke conditions,
   wherein the controller is further configured to update the stroke image according to the selected stroke condition and the accessed stroke trace, so that the display displays an updated handwriting image.

10. The control device of claim 1, further comprising:
    a pressure sensor, coupled to the touch sensing component and the controller, and configured to acquire a handwriting force of the touch sensing component when the touch sensing component moves on the plane,
    wherein the controller is further configured to generate the handwriting image according to the optical sensing data, the touch data and the handwriting force.

11. A control method for controlling a display, comprising:
    acquiring optical sensing data of a control device when the control device moves in an environmental space relative to a plane through an optical sensing component of the control device disposed in a body of the control device;
    acquiring touch data that the control device starts tracking the control device moves on the plane when the control device touches the plane through a touch sensing component of the control device disposed in a grip part of the control device, wherein the control device is hold by a user to write on the plane;
    acquiring a three-dimensional moving trace according to the optical sensing data through a controller of the control device;
    acquiring a two-dimensional handwriting trace according to the touch data through the controller;
    fusing the three-dimensional moving trace and the two-dimensional handwriting trace to generate a handwriting image through the controller; and
    displaying the handwriting image through the display.

12. The control method of claim 11, wherein the step of acquiring the optical sensing data of the control device when the control device moves in the environmental space comprises:
    photographing the environmental space to acquire at least one environmental image in the optical sensing data through at least one camera of the optical sensing component.

13. The control method of claim 12, wherein the step of generating the handwriting image according to the optical sensing data and the touch data comprises:

tracking a position and an angle of the control device when the control device moves in the environmental space relative to the plane according to the at least one environmental image and based on simultaneous a simultaneous localization and mapping algorithm, through the controller, so as to generate position and posture data; and generating the handwriting image according to the position and posture data and the touch data through the controller.

14. The control method of claim 11, further comprising: acquiring an inertial signal through an inertial measurement unit of the control device.

15. The control method of claim 14, wherein the step of generating the handwriting image according to the optical sensing data and the touch data comprises:

tracking a position and an angle of the control device when the control device moves in the environmental space relative to the plane according to the inertial signal and based on a simultaneous localization and mapping algorithm, through the controller, so as to generate position and posture data; and generating the handwriting image according to the position and posture data and the touch data through the controller.

16. The control method of claim 11, further comprising: determining whether the grip part of the control device touches the plane through an optical surface navigation sensor or a proximity sensor of the touch sensing component, wherein the optical surface navigation sensor or the proximity sensor is disposed in the grip part, when the grip part touches the plane, the optical surface navigation sensor or the proximity sensor starts to track the two-dimensional handwriting trace as the control device moves on the plane, so as to acquire the touch data.

17. The control method of claim 11, further comprising: displaying multiple stroke conditions through the display; generating a stroke trace according to the optical sensing data and the touch data through the controller; and generating the handwriting image according to the selected stroke condition of the stroke conditions and the stroke trace through the controller.

18. The control method of claim 17, further comprising: accessing the stroke trace and the stroke conditions in a memory of the control device through the controller;

updating the handwriting image according to the selected stroke condition and the accessed stroke trace through the controller; and displaying the updated handwriting image through the display.

19. The control method of claim 11, further comprising: acquiring a handwriting force of the touch sensing component when the control device moves on the plane through a pressure sensor of the control device; and generating the handwriting image according to the optical sensing data, the touch data and the handwriting force through the controller.

20. A virtual image display system, comprising:

a control device, suitable for controlling a display when the control device being hold by a user to write on a plane, comprising:

a body;

a grip part extending from the body;

an optical sensing component disposed in the body, and configured to acquire optical sensing data of the control device when the control device moves in an environmental space relative to a plane;

a touch sensing component disposed in the grip part, and configured to acquire touch data that the control device starts tracking the control device moves on the plane when the control device touches the plane; and a controller coupled to the optical sensing component, the touch sensing component and the display, and configured to:

acquire a three-dimensional moving trace according to the optical sensing data;

acquire a two-dimensional handwriting trace according to the touch data; and fuse the three-dimensional moving trace and the two-dimensional handwriting trace to generate a handwriting image; and the display, coupled to the controller, and configured to display the handwriting image.

* * * * *